(12) United States Patent
Mallet et al.

(10) Patent No.: US 8,446,433 B1
(45) Date of Patent: May 21, 2013

(54) INTERACTIVE VISUAL DISTORTION PROCESSING

(75) Inventors: Ronald Mallet, Mill Valley, CA (US);
Jeffrey Saltzman, San Francisco, CA (US); Brian Cantwell, Emeryville, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 1013 days.

(21) Appl. No.: 12/483,539

(22) Filed: Jun. 12, 2009

(51) Int. Cl.
*G09G 5/00* (2006.01)

(52) U.S. Cl.
USPC ........... 345/647; 345/581; 345/619; 345/629; 345/630; 345/643

(58) Field of Classification Search
None
See application file for complete search history.

(56) References Cited

U.S. PATENT DOCUMENTS

| | | | | |
|---|---|---|---|---|
| 5,926,611 A * | 7/1999 | Yang et al. | | 386/329 |
| 2004/0071336 A1* | 4/2004 | Yui | | 382/147 |
| 2004/0169724 A1* | 9/2004 | Ekpar | | 348/36 |
| 2010/0265048 A1* | 10/2010 | Lu et al. | | 340/435 |

* cited by examiner

*Primary Examiner* — Kee M Tung
*Assistant Examiner* — Jwalant Amin
(74) *Attorney, Agent, or Firm* — Kilpatrick Townsend & Stockton LLP (57) ABSTRACT

A system includes a computing device that includes a memory for storing one or more computer graphics, and a graphics distorter. The graphics distorter applies a distortion model to the computer graphic to produce a distorted version of the computer graphic, while substantially simultaneously allowing user interactions with the computer graphic. The applied distortion model represents lens distortion.

30 Claims, 8 Drawing Sheets

INTERACTIVE VISUAL DISTORTION PROCESSING

TECHNICAL FIELD

This document relates to interactively processing computer graphics to simulate visual distortions such as lens distortion.

BACKGROUND

In the ever expanding field of analog and digital photography, camera lens may be designed to suit nearly any photographic situation. For example, by selecting an appropriate lens for a particular situation, unique and breathtaking photographs may be captured that might not be visual with the naked eye. Zoom, wide-angle, macro, telephoto, and other types of lens may be available from an overwhelming array of camera lens. In general, lens direct light rays to recreate an image as accurately as possible on film, a digital sensor, etc. As with most manufactured products, imperfections may be introduced during production or through use (e.g., mishandling of lens, accidents, etc.). Based upon the introduced imperfections, optical aberrations may occur when the directed light rays do not appropriately translate though the lens, causing image blurring, reduced contrast or color misalignment or other similar phenomena.

SUMMARY

The systems and techniques described here relate to applying models that represent lens distortion to a computer graphics while allowing a user to interact with the computer graphics.

In one aspect, a computer-implemented method includes applying a distortion model to a computer graphic to produce a distorted version of the computer graphic, while substantially simultaneously allowing user interactions with the computer graphic. The applied distortion model represents lens distortion.

Implementations may include any or all of the following features. For example, the method may further include combining the distorted computer graphic with an image captured with a lens. The distortion model may represent distortion provided by the lens. User interactions may include manipulating the computer graphic as the distortion model is applied. In some arrangements, the distortion model may include a reduced sample set. A predefined threshold may be used to determine the size of the reduced sample set. For example, the predefined threshold may be based upon a comparison of the reduced sample set distortion model and a distortion model that includes a complete sample set. The predefined threshold may also represent the difference between a pixel represented in the reduced sample set distortion model and a pixel represented in the complete sample set distortion model. The predefined threshold may represent various quantities such as a fraction of a pixel. Portion of the computer-implemented method may be repeated. For example, applying the distortion model to the computer graphic may include repetitively applying the distortion model during user interactions with the computer graphic. The computer graphic may also include a computer generated three dimensional object, an image or other type of object. The computer graphic may also represent a user selection device. The distorted version of the computer graphic may also have a relatively low resolution.

In another aspect, a system includes a computing device that includes a memory for storing one or more computer graphics, and a graphics distorter. The graphics distorter applies a distortion model to the computer graphic to produce a distorted version of the computer graphic, while substantially simultaneously allowing user interactions with the computer graphic. The applied distortion model represents lens distortion.

In another aspect, a computer program product tangibly embodied in an information carrier and comprising instructions that when executed by a processor perform a method that includes applying a distortion model to a computer graphic to produce a distorted version of the computer graphic, while substantially simultaneously allowing user interactions with the computer graphic. The applied distortion model represents lens distortion.

DESCRIPTION OF DRAWINGS

Like reference symbols in the various drawings indicate like elements.

DETAILED DESCRIPTION

Figure 1:
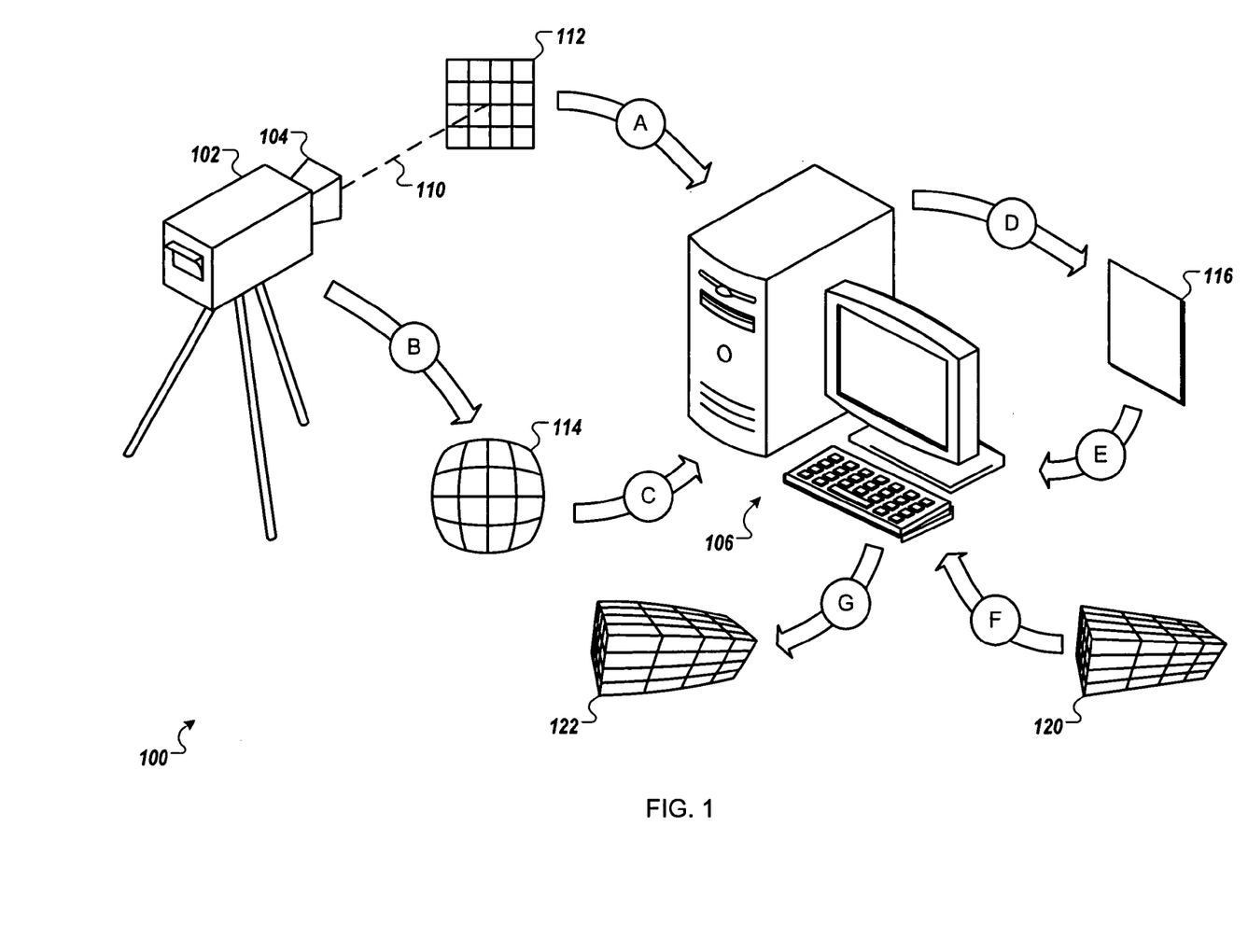
FIG. 1 illustrates a visual processing system for producing and applying a distortion model.

FIG. 1 illustrates an exemplary visual processing system 100 that can generate and apply distortion models. In some implementations, the visual processing system 100 can use one or more distortion models, while interacting with a user, to render distorted computer graphics that appear as if seen through a physical camera lens (and subject to distorting effects associated with the lens). For example, graphics such as computer-generated animation, images, objects, and models can be modified by the application of one or more distortion models based on properties associated with a particular lens. Once distorted, the modified graphics can be incorporated with images captured by the lens or by a similar lens. For example, a computer-generated character can be distorted based upon the characteristics of a lens that is used to capture an image of a wall. Once distorted, the character can be placed within the image of the wall (e.g., to smoothly illustrate the character leaning against the wall).

The exemplary visual processing system 100 includes a camera 102, however multiple cameras may be utilized in some implementations. The camera 102, for example, may be configured to capture moving or still images. Along with other components, the camera 102 includes a lens 104 that may fall into one of many categories (e.g., macro lens, wide-angle lens, telephoto lens, fisheye lens, zoom lens, etc.). Such lenses are typically afflicted with small imperfections that can distort captured images. In some cases, such imperfections may be minute and barely noticeable, or, in other cases noticeable distortions may be detected even by the untrained eye. Regardless of severity, distortion caused by imperfections may be characterized and cataloged like individual fingerprints. For example, the distortion may be characterized by one or more distortion patterns and cataloged with information associated with the corresponding lens (e.g., lens type, model, serial number, manufacturer, date of manufacture, etc.).

To characterize and catalog these lens distortions, in this particular example, the visual processing system 100 includes a computer system 106. To provide such functionality, the computer system 106 can include one or more components such as processing devices (e.g., one or more microprocessors), input devices (e.g., camera interfaces), output devices (e.g., displays), and storage devices (e.g., memories, hard drives, CD-ROMs, etc.).

To characterize lens distortion, one or more techniques and methodologies may be implemented. For example, calibration images can be produced and captured in images by the lens 104 to develop one or more distortion profiles that characterize the lens distortions. In this particular arrangement, a calibration image 112 can be captured in an image (at a perspective represented by a sight line 110) by the camera 102 using the lens 104. Various types of designs and patterns (e.g., grids) with known characteristics (e.g., pattern elements, element size and position, etc.) may be illustrated on the calibration image 112 to allow the distortion to be quantified. As shown by process arrow A, aspects of the calibration image 112 can be made available to the computer system 106, for example, by one or more representations (e.g., visual image, numerical data). As such, an undistorted representation of the calibration image 112 may be used by the computer system 106, for example, in comparisons of distorted representations of the image.

As illustrated by process arrow B, a captured calibration image 114 can be captured by the camera 102 (using the lens 104) in which the calibration image 112 is the subject of the image. Depending upon properties of the lens 104 the captured calibration image 114 can include, for example, varying types and amounts of distortion. As shown by process arrow C, one or more representations (e.g., visual, numerical data, etc.) of the captured calibration image 114 can be provided to the computer system 106. In some implementations, the captured calibration image 114 can be transferred to the computer system 106, for example, as an image or data file. For this particular system layout, processing the captured calibration image 114 is primarily executed at the computer system 106, however, in some implementations, the camera capturing the calibration image or another computing device operating nearby the camera can process the captured calibration image. For example, upon processing the calibration image 114, the camera 102 may transfer associated image data (e.g., relative positions and sizes of pattern elements as distorted by the lens 104) to the computer system 106 for additional processing, storage and use.

As shown by process arrow D, in some implementations, the computer system 106 uses the calibration image 112 and the captured calibration image 114 to produce a distortion model 116 that represents the distortion introduced by the lens 104. One or more techniques and methodologies may be used to produce such distortion models. For example, characteristics of the calibration image 112 can be compared with characteristics of the captured calibration image 114 to produce the distortion model 116 (e.g., a mathematical model) that may be used in one or more applications (e.g., applying the lens distortion on computer-generated graphics). Various representations may be implemented to define the distortion model 116, for example, a high-order polynomial or other types of numerical expressions can be used to represent lens distortion. Once represented, the polynomial may be applied to a set of point coordinates, which represents a computer generated graphic, to adjust the coordinates and produce a distorted version of the computer graphic. In some implementations, the distortion model 116 can be enhanced by adding additional information such as additional polynomial terms to represent aspects such as higher order coefficients, non-centered principal point(s), non-radial distortion, and anamorphic aspect ratios, or other similar aspects.

One or more storage or archiving techniques may be implemented by the visual processing system 100. For example, the distortion model 116 can be stored in a library (e.g., a database accessible by the computer system 106). Based upon such storage capabilities, one or more distortion models (e.g., the distortion model 116) can be produced and cataloged for a variety of camera lenses (e.g., the lens 104). To assist with cataloging, a lens identifier (or other type of catalog mechanism) can be assigned and stored with each distortion model to assist with cataloging and storage operations (e.g., model retrieval, logging, etc.). In some arrangements, multiple models may be produced for a single lens. For example, a lens can have varying distortion characteristics associated with varying lens settings (e.g., focus, zoom, etc.). As such, a set of distortion models can be produced across a range of possible settings. Using one or more data processing and storing techniques, multiple models (e.g., associated with one lens) can be combined and stored for later retrieval by the computer system 106 (e.g., based upon lens identifiers and lens settings).

Various techniques can be employed to apply the distortion model 116, for example, the distortion model 116 can be applied to an undistorted object 120. The undistorted object 120, for example, can include three-dimensional graphic content generated by the computer system 106 or content generated by another system and transferred to the system 106. As shown by process arrows E and F, the computer system 106 may apply the distortion model 116 to the undistorted object 120. From this data, as shown by process arrow G, the computer system 106 may produce a distorted object 122 by applying the distortion model 116 to the undistorted object 120. In this particular example, the distorted object 122 may represent the undistorted object 120 if captured in an image using the camera lens 104.

In some implementations, the distortion model 116 may be applied to one or more computer generated graphics (e.g., to produce distorted objects) in a substantially simultaneous manner as a user interacts with the computer system 106. As such, relatively little latency may be experienced as the user manipulates an object, the object is distorted (by application of the distortion model 116), and the distorted object is presented. For example, using a mathematical model to distort each point included in the undistorted object 120 (to produce the distorted object 122) may be computationally intensive as the calculations can involve computing the roots of a high-order polynomial. As such, one or more techniques may be implemented to reduce processing latency caused by the computation needs that may hinder user interactivity. For example, a reduced set of data points (sampled from the distortion model 116) may be used rather than applying a complete distortion model, thereby reducing computations (e.g., performed by a central processing unit (CPU), a graphical processing unit (GPU), etc.) of the computer system 106. To process the reduced sample set, one or more techniques may be implemented, for example, interpolation and similar techniques may also be used applying a distortion model represented with a reduced number of samples.

In some implementations, the distorted object 122 (e.g., a computer graphic image distorted by the distortion model 116) can be combined with one or more images captured by the lens from which the distortion model was produced (e.g., lens 104). For example, real-world images or footage captured by the camera 102 and the lens 104 can be interactively combined with the distorted object 122, and a user of the system can view composite images or footage substantially in real-time. An interactive, real-time combination of actual images (or footage) captured by a lens and distorted computer graphics (based upon the lens) can allow a user of the computer system 106 to view and work with a composite that substantially appears as a final product. Such an interactive technique may be computationally efficient compared to methods that first remove distortion from images (to enable undistorted images and undistorted computer generated graphics to be combined) and secondly distort the combined images.

In some implementations, to reduce latency, objects may be initially rendered with a relatively low resolution to increase processing speeds. For example, a lower resolution can be specified for generating the distorted object 122 (and to provide expedited rendering). The rendered lower quality can be comparable to the resolution of a video game, a wire-frame resolution, or a shaded environment, to name a few examples. Once the low resolution object is manipulated, e.g., into a desired position, a final rendering of the object may be produced at a high-quality resolution in preparation for display.

Various types of imagery and graphic representations may also be processed by the visual processing system 100 to apply distortions associated with a lens. For example, distortion may be applied to computer-generated images, virtual photography or footage, etc. For example, images generated without the use of a physical lens can be altered to appear as though they were captured by a physical lens (e.g., the lens 104). Distortion may be applied in an interactive manner such that a distorted version of the images may be viewed substantially in real time.

Similar to applying distortion, distortion associated with a lens may be removed by the visual processing system 100. For example, images captured by a physical lens can be altered to appear without distortion or altered to appear as if the images were captured by another physical lens. As such, one or more distortion models (e.g., the distortion model 116), for example, can be interactively applied to images by the computer system 106 to enable a user to view a distorted or corrected version of the images in an interactive manner (e.g., substantially in real time).

Figure 2:
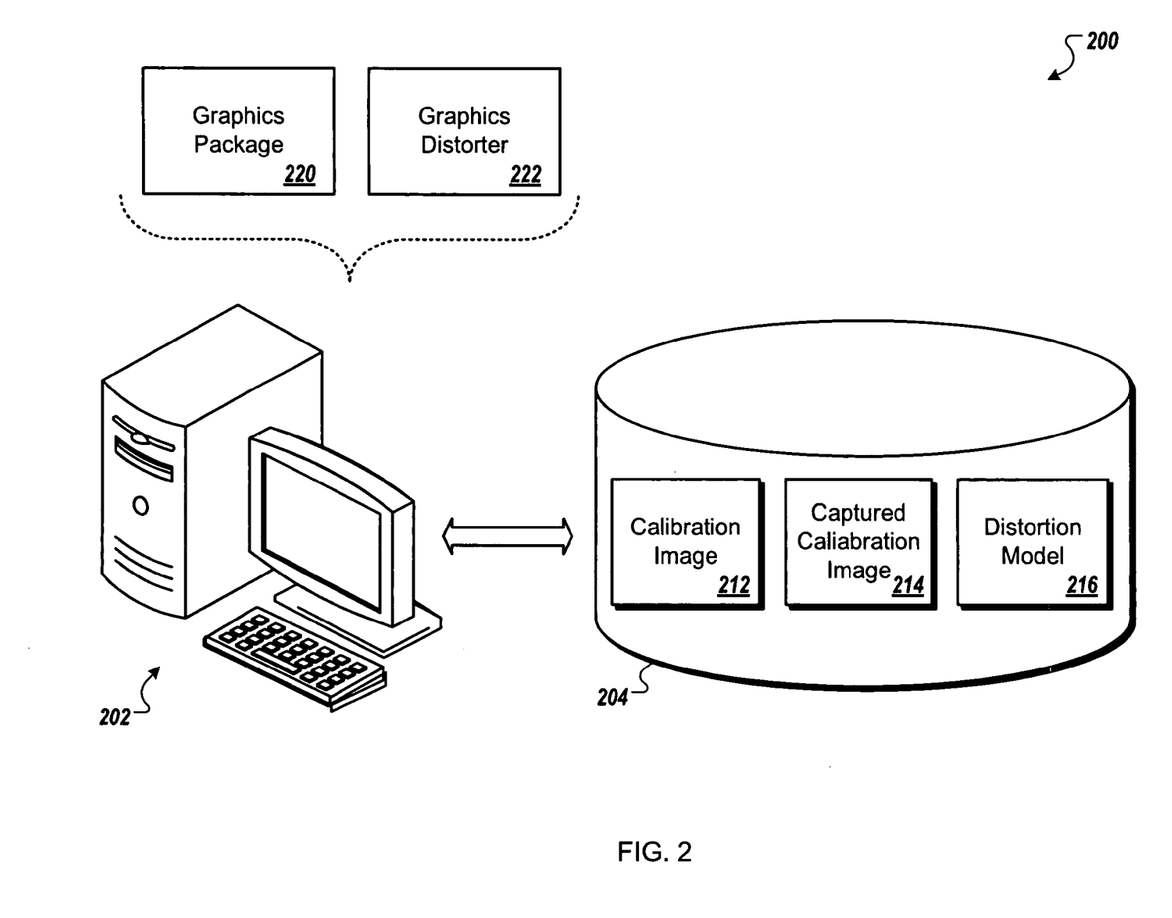
FIG. 2 illustrates an interactive computer graphic processing system.

Referring to FIG. 2, an exemplary visual processing system 200 is capable of performing various operations (e.g., calibrating, distorting, storing, etc.) to produce and use distortion models. In some arrangements, distortion models may be produced and applied in an interactive manner to distort computer-generated graphics, similar to distortion produced by a camera lens. In this particular example, the visual processing system 200 includes a computer system 202 (similar to the computer system 106 shown in FIG. 1) in communication with a storage device 204 (e.g., a hard-drive, CD-ROM, etc.). To provide the operations, the computer system 202 includes software modules such as a graphics package 220 and a graphics distorter 222, however, in some arrangements, the functionality of one or both of the modules may be incorporated into a hardware (e.g., circuitry) or a combination of hardware and software. Further, while two distinct modules (e.g., the graphics package 220 and the graphics distorter 222) are illustrated, the functionality of the modules may be combined into a single module or distributed across additional modules (e.g., three or more).

In general, the graphics package 220 allows a user (e.g., graphic artist, developer, etc.) to produce, edit and manage image content. For example, the graphics package 220 may provide an interface for creating, manipulating, and organizing one or more graphical representations (e.g., computer-generated graphics, images captured by lenses, etc.). For example, the graphics package 220 may be used to retrieve images, models or other types of graphical representations from a library (e.g., stored on the storage device 204), interactively allow a user to operate on the images and models, and store the created, modified, or combined images, models and other graphical representations in the library. To produce and apply one or more distortion models, the graphics distorter 222 can operate in association with the graphics package 220, for example, the graphics distorter may generate distortion models (e.g., mathematical models based on calibration images) and to apply distortion models (e.g., adjusting vertices of computer generated graphics or image pixels).

In general, the storage device 204 is capable of storing various types of data such as one or more calibration images (e.g., a calibration image 212), one or more captured calibration images (e.g., a captured calibration image 214), and one or more distortion models (e.g., a distortion model 216, similar to the distortion model 116). The calibration image 212, for example, can be an image with determinable characteristics and can include data related to the image defining attributes. The captured calibration image 214, for example, can be an image representing the calibration image 212 as captured by a lens (e.g., the lens 104 as shown in FIG. 1) and can include data that represents attributes of the image. The distortion model 216 can be based on aspects of the calibration image 212 and the captured calibration image 214. In some implementations, the distortion model 216 can include a mathematical model produced by the graphics distorter 222. For example, aspects of the captured calibration image 214 can be compared with aspects of the calibration image 212 by the computer system 202 to generate the distortion model 216. As such, the model 216 may represent distortion of the calibration image 212 as viewed through a lens. Along with be represented with images (e.g., the calibration image 212, the capture calibration image 214, etc.), various type of representations may be used. For example, numerical values, numerical expressions, etc. may be used individually or in combination to represent the calibration and captured calibration information. To collect such calibration information (e.g., the captured calibration image 214) and for passing data and information between the computer system 202 and the storage device 204 various communication techniques may be implemented. For example, hardwire or wireless techniques (or a combination of wired and wireless techniques) may be implemented.

Figure 3:
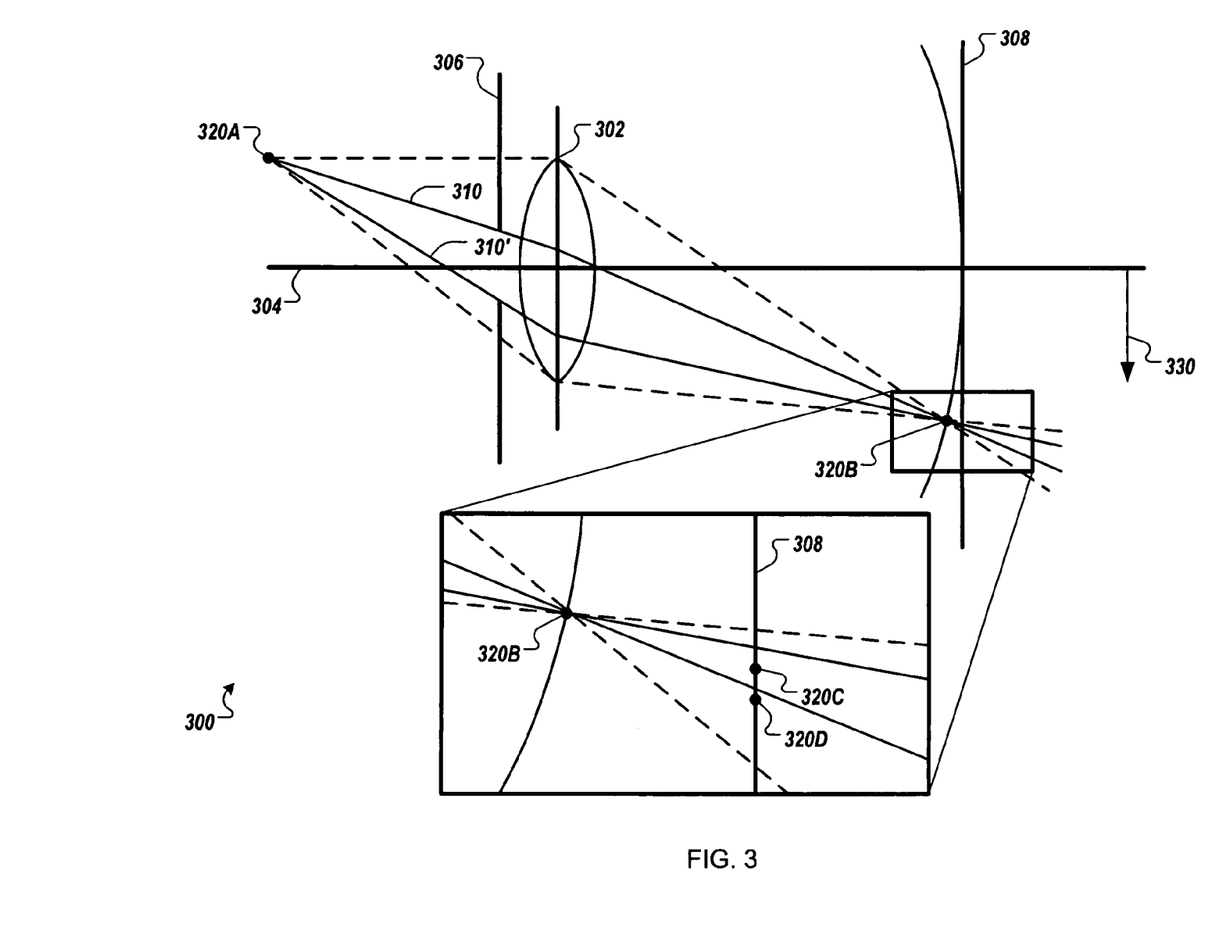
FIG. 3 illustrates lens distortion.

Referring to FIG. 3 a diagram of a lens configuration 300 illustrates one typical type of distortion that may be provided by a lens 302. A point 320A represents, e.g., a point in a three-dimensional scene being captured by the lens 302. To represent the capture, light rays 310, 310' propagate from the point 320A, traverse an aperture 306 provided by the lens 302 (and perpendicular to an optical axis 304 of the lens) and enter the lens 302. Due to attributes of the lens 302 (e.g., shape, imperfections, etc.), the projection of the point 302A provided by the lens is distorted. In particular, point 320B, which represents a projection of the point 320A, does not properly lie on an image plane 308 of the lens. Rather the point 320B is located in front of the image plane 308 (referring to the exploded view of the point and the image plane) and a circle of confusion is projected onto the image plane. In this example, a point 320C represents the distorted projection of the point 320B, based upon the lens 302 (e.g., the radius 330 of the lens). Correspondingly, a point 320D represents the undistorted projection of the point 320B onto the image plane 308. While the radius 330 of the lens 302 causes distortion in this instance, other phenomena and properties (e.g., shape, thickness, materials, etc.) can cause and affect an amount and type of distortion.

Figure 4A:
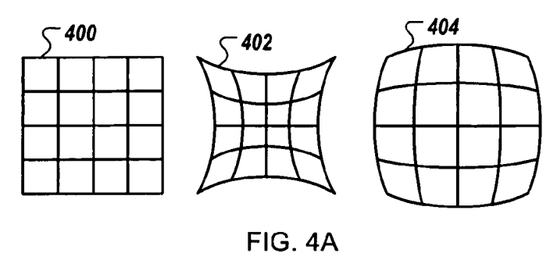
FIG. 4A illustrates types of image distortion.

Referring to FIG. 4A, various examples of image distortion are illustrated that may be provided by a lens (e.g., lens 104). The type and level of distortion can differ based upon lens type, model, manufacturer, and other type of production specification information. For demonstrative purposes, an undistorted image 400, which includes a pattern of vertical and horizontal lines, may be captured through a lens. Based upon imperfections of the lens, the captured image may be distorted. For example, a captured image may exhibit pincushion distortion as represented by a pincushion distortion pattern 402. Generally, a pincushion pattern, which may exhibit increased image magnification with the distance from the optical axis of a lens, can be produced by a telephoto or similar lens. In another example, distortion may exhibit a decrease in image magnification with increased distance from the optical axis of the lens. Such a distort, referred to as barrel distortion, is represented by a barrel distortion pattern 404 and can be caused by a fisheye or similar lens. Other types of distortion (e.g., combinations of pincushion and barrel distortion, irregular distortion, etc.) are possible, depending on one or more lens properties (e.g., shape, thickness, materials, etc.).

In some implementations, the undistorted image pattern 400 can serve as a calibration image (e.g., similar to the calibration image 112). Being provided to the visual processing system 200 (shown in FIG. 2), the undistorted image pattern 400 may be used by the graphics distorter 222 as a reference image to quantify the distortion (e.g., pincushion distortion, barrel distortion, combinations of distortions, etc.) provided by the image capturing lens. Once quantified, the data representing the distortion can be used by the graphics distorter 222 for distorting computer generated graphics or similar imagery.

Figure 4B:
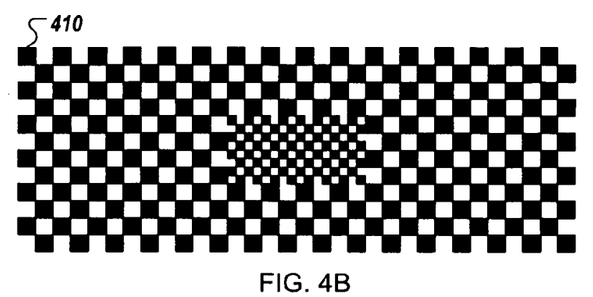
FIG. 4B illustrates an exemplary calibration pattern.

In some implementations, other calibration patterns can be used. Referring to FIG. 4B, a checkerboard calibration pattern 410 is shown. The calibration pattern 410 can have known characteristics (e.g., variously sized and positioned shapes, alternating colors, etc.). In one arrangement, the calibration pattern 410 can be compared (e.g., by the graphics distorter 222) to an image of the pattern 410 captured through a lens (e.g., the lens 104 as shown in FIG. 1) for quantifying differences to model characteristics of the lens. Various patterns, formats and graphical styles may be incorporated in a calibration pattern, for example, the calibration pattern 410 can be framed such that the center of the pattern 410 is aligned along and perpendicular to the optical axis of a lens.

In some implementations, the calibration pattern 410 can be selected that includes additional detail for providing a greater level of differentiation with a captured image of the pattern. For example, considering a lens producing a greater amount of distortion close to the optical axis, a calibration pattern may be selected to provide a finer level of detail near the center of the pattern. As another example, considering a lens that produces more distortion further away from the optical axis, a calibration pattern can be selected with a finer level of detail away from the center of the pattern.

Figure 4C:
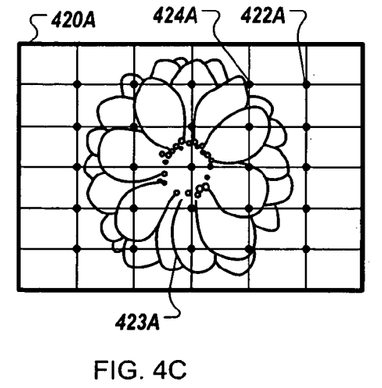
FIGS. 4C and 4D illustrates exemplary warping grids.
Figure 4D:
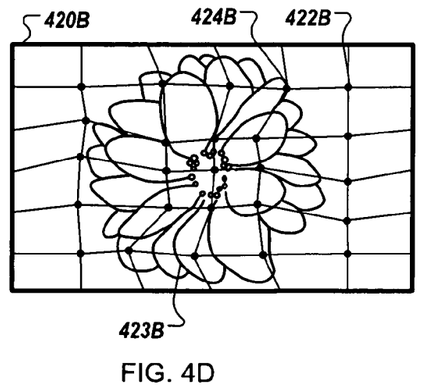

As shown in FIG. 1 and FIG. 2, calibration images (e.g., patterns) and captured calibration images (e.g., distorted patterns) can be used to generate one or more distortion models (e.g., the distortion models 116 and 216). Referring to FIG. 4C, in some implementations, warping grids may be produced from one or more distortion models. In general, a warping grid can distort or remove distortion by being applied to an image (e.g., a computer generated graphic, an image captured by a lens, etc.). For example, as shown in FIG. 4C, a warping grid 420A is shown overlaying an image of a flower 423A. The warping grid 420A includes a vertices (e.g., vertices 422A, 424A, etc.) that can be individually manipulated to distort (or correct) the image 423A. In this example, the vertices are uniformly positioned over the image 423A. To manipulate the image 423A, each vertex of the warping grid 420A is associated with the respective pixel located below the vertex. Based upon the association, as the vertex changes position, the pixel beneath similarly changes position. As such, by changing positions of the vertices, the image may be distorted (or corrected). Referring to FIG. 4D, by manipulating the positions of warping grid vertices, pixels of an image (associated with the vertices) are similarly manipulated. In this example, positions of some vertices (e.g., vertex 424B) of a warping grid 420B are significantly altered compared to other vertices (e.g., vertex 422B) included in the grid. Tracking the manipulations, pixels of an image 423B that are associated with the vertices are correspondingly altered to distort the image.

In this implementation, each of the warping grids 420A and 420B include a reduced number of samples compared to the distortion model from which the grids are produced. For example, each of the illustrated warping grids 420A, 420B include twenty-five vertices that may be used to manipulate a pixel associated with each vertex. As such, the positions of twenty-five pixels may be adjusted by the vertices. To adjust the other image pixels, one or more techniques may be implemented. For example, interpolation techniques may be used by the graphics distorter 222 to determine position adjustments for pixels located between vertices of a warping grid. As such, the movement of one or more vertices may factor into interpolating the movement of one or more neighboring pixels. The influence of vertices may also be weighted, for example, vertex manipulations relatively close to a pixel may be more heavily weighted than manipulations of a more remote located warping grid vertex. Pixel grouping may also be implemented for pixel manipulation. For example, a group of neighboring pixels may be grouped and the pixel group may be associated with a particular warping grid vertex (located above the pixel group). Interpolation and movement weighting operations may similarly be executed on pixel groups, or a combination of pixel groups and individual pixels, for example, to increase computation efficiency.

Along with using one or more techniques to quantify pixel movements based upon a warping grid, the graphics distorter 222 may also determine the appropriate amount of samples to include in a warping grid. In general, computational efficiency increases (e.g., reduced processing time periods, reduced memory needs, etc.) by reducing the number of grid samples. However, reducing the number of samples increases the use of interpolation (or a similar technique) and the appropriate amount of distortion may not be properly applied to images. As such, the graphics distorter 222 may utilize one or more techniques to determine sampling amounts. For example, pixel variations between a reduced sample amount (e.g., included in a warping grid) and a complete sample set may be compared. In one implementation, the graphics distorter 222 may apply the complete sample set of a distortion model to an image (e.g., image 423A) and a reduced sample set the distortion model (e.g., the warping grid 420A) to the same image. The two distorted images may then be compared, for example, to determine if one predefined threshold (or multiple thresholds) have been met. For example, the difference between each of the two distorted images may be calculated per pixel (or pixel group) and the maximum pixel difference may be calculated. Once identified, the maximum pixel difference can be compared to a predefined threshold. If the difference is equivalent or less than the predefined threshold (e.g., 1/100 of a pixel), the reduced sample set may be considered a valid representation of a complete sample set. If the difference exceeds the predefined threshold, the reduced sample set may be considered an overly coarse representation and the graphics distorter 222 may increase the sample size. After applying the increased sample set of the distortion model to the image, calculations may be repeated to determine if the maximum difference is equivalent to below the threshold value. Once the threshold is met, the reduced sample set may be used to distort a variety of images, computer generated graphics, or other type of graphics in a computationally efficient manner.

Various thresholds may be implemented for defining a distortion model, for example, a threshold ranging above or below particular values (e.g., 1/100 of a pixel) may be specified. In one example, as a threshold can represent an amount of disparity indistinguishable by the human eye, a determination can be made to perform a smaller number of computations to achieve a result visually similar to that of performing a larger number of computations.

As such, reduced sample sets of a distortion model such as a warping grid (e.g., grids 420A and 420B) may be applied and reapplied in a relatively rapid manner. Further, since the warping grid need not be redefined for each instance it is applied to an image (or a computer generated graphic), a user can interact nearly in real time with the image as it is distorted based upon the user interactions. So, the reduced sample distortion model allows images to be efficiently altered with relatively little latency during user interactions. For example, setting an error threshold can enable the graphics distorter 222 to designate a set of sample points (e.g., vertices) in a warping grid for optimizing processing speed and accuracy associated with image distortion and correction Referring to FIG. 4E, a graphic object (e.g., a computer-generated graphic or model) may also be distorted by a distortion model similar to an image. As shown in the figure, an undistorted object 430A can be transformed into a distorted object 430B by applying a warping grid (e.g., warping grid 420A). Similarly, the distorted object 430B can be transformed into the undistorted object 430A by applying the counterpart warping correction grid.

Figure 4E:
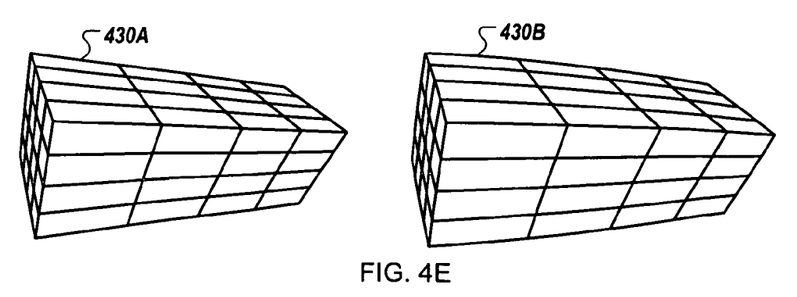
FIG. 4E illustrates application of warping grid to a graphic object.

One or more techniques and methodologies may be implemented for applying a warping grid, or other functionality provided by the graphics distorter 222. For example, one or more software modules or processes may provide the application. In one implementation, a process used to transform the attributes (e.g., position, color, etc.) of vertices (referred to as a vertex shader) may be used to apply one or more warping grids to graphic objects (e.g., the objects 430A and 430B). Along with being executed by a processor, a process such as a vertex shader can be incorporated into various types of computational hardware. For example, for one or more graphics boards optimized for processing computer-generated graphics and models (e.g., 3D graphics), a vertex shader can be used to process graphical elements.

Figure 5:
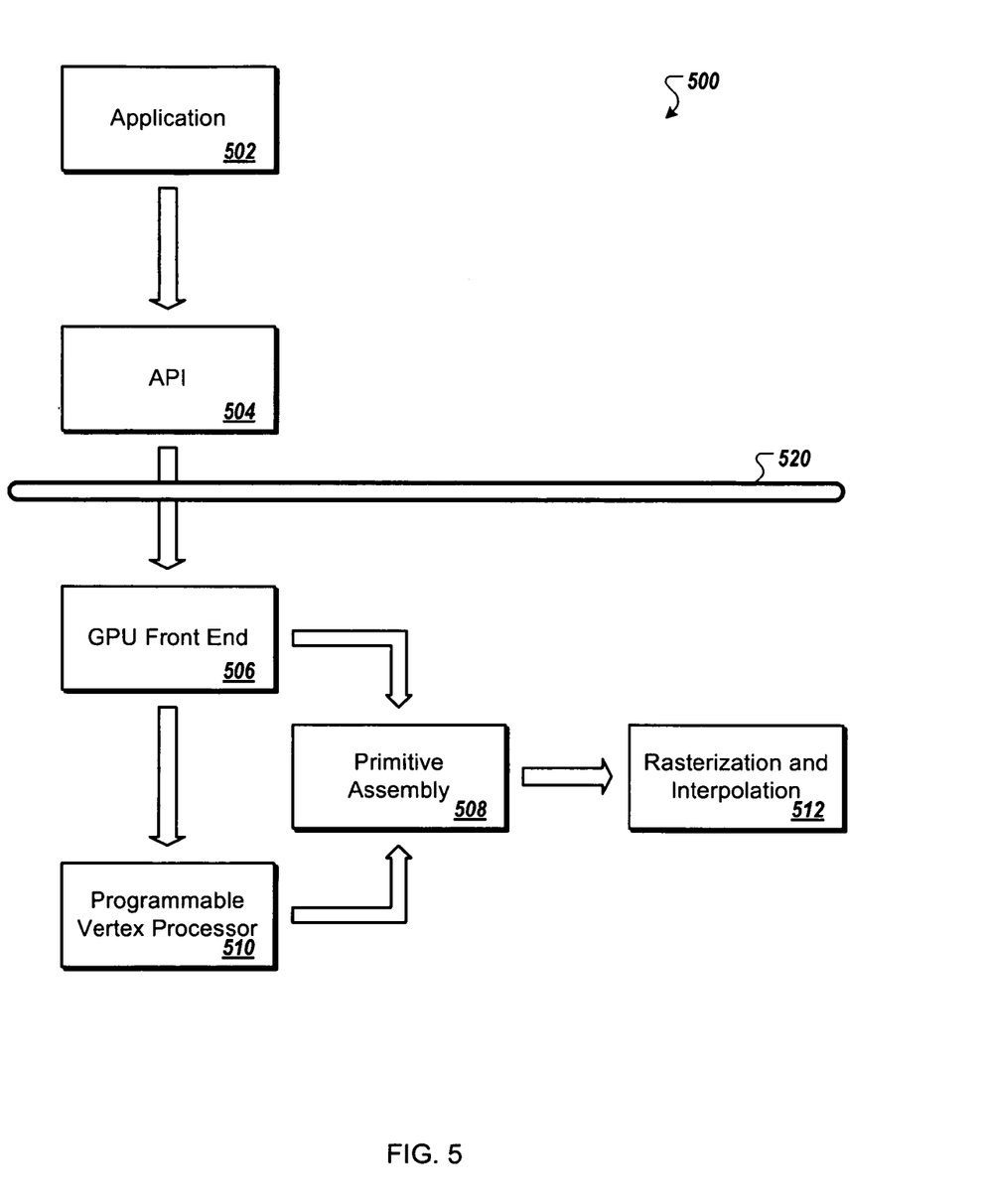
FIG. 5 is a diagram of stages for a rendering process.

Referring to FIG. 5, an exemplary rendering process 500 exploits central processing unit (CPU) technology and graphical processing unit (GPU) technology capabilities. As illustrated in the figure, some functionality is provided by a CPU while other functions are provided by a GPU. To separate CPU and GPU functions, a CPU/GPU boundary 520 is illustrated. However, in some arrangements distribution of the functions may be altered. For example, functionality of the CPU may be moved to the GPU, and vice versa. One or more CPU's and GPU's may be used to provide this functionality. Additionally, while an equivalent number of CPU's and GPU's may be used in some arrangements, the amount of processing units in other arrangements may not match.

For this implementation, a vertex shader technique is used for applying one or more warping grids. To execute the technique, one or more computational platforms and devices (e.g., computer system 106, computer system 202, etc.) may be utilized. In this example, CPU provided functionality includes an application 502 (e.g., the graphics package 220, a virtual environment or game, etc.) that communicates with an application programming interface (API) 504 (e.g., OpenGL, Direct3D, etc.) by using API commands (e.g., 3D commands). The API 504, for example, may translate commands from the application 502 and communicate with a GPU front end 506 across the CPU/GPU boundary 520. Various types of information may be passed over this boundary, for example, commands (e.g., GPU commands, CPU commands, etc.) and data (e.g., data streams, etc.) may be exchanged.

The GPU front end 506, for example, may send a stream of vertices (e.g., a vertex index stream) to a primitive assembly 508. The GPU front end 506 may also send vertices to a programmable vertex processor 510. For example, the provided vertices may be in a pre-transformation condition and the programmable vertex processor 510 may execute operations to transform the vertices. In this arrangement, operations of the programmable vertex processor 510 may include operations of a vertex shader that includes applying one or more warping grids to distort the vertices. In general, such operations of a vertex shader may introduce low latency during execution, thereby allowing a user to substantially interact with objects (e.g., images and computer graphics) in real-time while the objects are being processed by the vertex shader.

In this implementation, a primitive assembly 508 receives transformed vertices produced by the programmable vertex processor 510 along with a vertex index stream from the GPU front end 506. From the provided data, the primitive assembly 508 may generate assembled polygons, lines and points, and provide the generated information to a rasterizer and interpolator 512. Along with providing subsequent processing operations (e.g., interpolation, etc.), the rasterizer and interpolator 512 may be used to produce one or more images for presentation (e.g., on an output device such as a computer display). In addition to these operations, additional operations may be provided by the process 500. For example, processing individual pixels (e.g., pixel shading operations to change to appearance of pixels) or pixel groups may be provided in preparation of producing one or more frames (e.g., and storing frames a buffer) prior to presentation.

Along with distorting images, computer generated graphics and similar types of graphics, other types of objects may also be distorted by the graphics distorter 222 to account for lens attributes. For example, a selection device (e.g., an on-screen pointer) may be distorted in a similar manner. In general, selection devices allow a user to interact with presented graphics and imagery. For example, based upon a linear projection from the selection device onto the screen, a user may control the selection of one or more displayed objects. However, if the displayed objects have been distorted (to account for a particular lens), a proper linear projection between the selection device and the distorted objects may not be provided. To provide proper alignment, the selection device may be distorted in a manner similar to the displayed objects. For example, the graphics distorter 222 may also be used to distort the presentation of a selection device to enhance user interactions. In one arrangement, a user of a computer graphic processing system (e.g., the system 100 or the system 200) may use an input device (e.g., a mouse, tablet, etc.) to direct a corresponding pointer, e.g., for selecting a displayed object. As the object processed to be rendered in distorted space (as provided by the graphics distorter 222), a pointer position may also be similarly distorted by the graphics distorter. In one implementation, the distortion may be provided by a vertex shader to reduce latency. As such, a warping grid may be applied to the coordinates of the pointer to allow the user to interact with similarly distorted graphical objects in substantially real-time.

Figure 6:
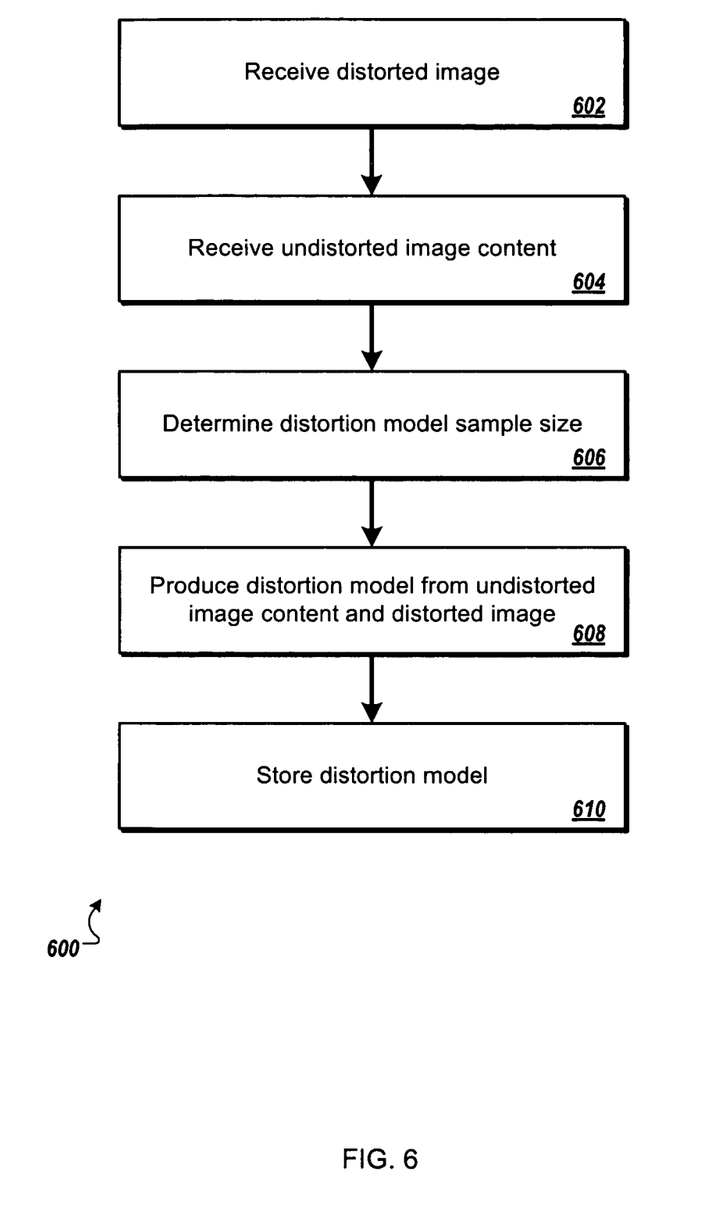
FIGS. 6 and 7 are flowcharts that represent operations of a graphic distorter.

Referring to FIG. 6, a flowchart 600 represents some operations of the graphics distorter 222. The operations may be executed by a single computer system (e.g., the computer system 106 or the computer system 202) or multiple computing devices. Along with being executed at a single site (e.g., at one computer system), operation execution may be distributed among two or more sites.

Operations include receiving 602 a distorted image (e.g., the captured calibration image 214) and receiving 604 undistorted image content (e.g., the calibration image 212). In some implementations, additional information may also be provided, for example, information that particularly identifies image content (e.g., for cataloging), information identifying particular image capturing equipment (e.g., a lens, camera, etc) or other similar information. Operations may also include determining 606 distortion model sample size such as the number of samples to include in a warping grid. For example, a distortion model sample size can be based on a specified error threshold (e.g., equal to or less $\frac{1}{100}$ of a pixel). By repetitively comparing the distortion provided by a distortion model with a complete sample set and the distortion provided by a model with a reduced sample size, an appropriate reduced sample size may be determined. For example, a reduced sample size may be selected from the comparison in which the error threshold is not exceeded.

Operations of the graphics distorter 222 may also include producing 608 a distortion model from undistorted image content, a distorted image and the determined reduced sample size. For example, known and determined characteristics of undistorted image content (e.g., the calibration image 212) and a distorted image (e.g., the captured calibration image 214) may be used by the graphics distorter 222 to produce one more mathematical models that may be applied to graphical objects to incorporate the distortion effects. Operations may also include storing 610 the one or more distortion models. For example, a distortion model (e.g., the distortion model 216) can be stored in a library (e.g., in the storage device 204) for retrieval by subsequent operations.

Figure 7:
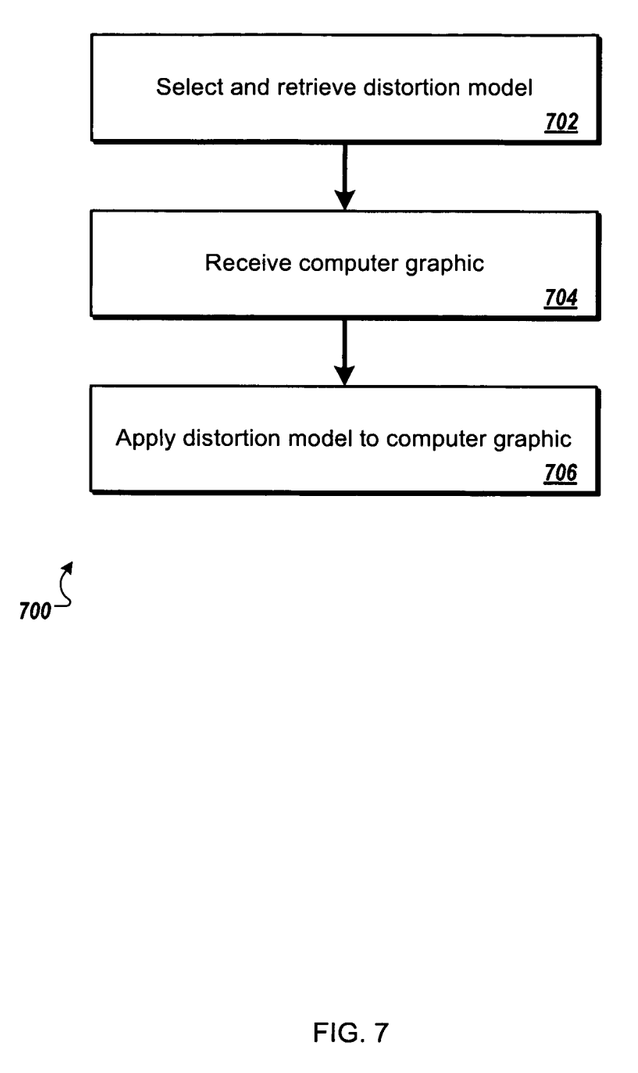

Referring to FIG. 7, a flowchart 700 also represents some operations of the graphics distorter 222. The operations may be executed by a single computer system (e.g., the computer system 106 or the computer system 202) or multiple computing devices. Along with being executed at a single site (e.g., at one computer system), operation execution may be distributed among two or more sites.

Operations include selecting and retrieving 702 a distortion model (e.g., the distortion model 216). For example, the graphics distorter 222 can select and retrieve a distortion model from a library (e.g., stored on the storage device 204) that includes models associated with a variety of lens and associated lens parameters (e.g., lens type, manufacturer, etc.). The selection and retrieval 702 of a distortion model, for example, could also be based on characteristics and settings to emulate a particular camera lens. Operations may also include receiving 704 a computer graphic. For example, a graphic such as the undistorted object 430A (as shown in FIG. 4E) can be received by the graphics distorter 222. Graphics, for example, can be retrieved from a database or library (e.g., in the storage device 204), or provided by a software module or package (e.g., the graphics package 220) that is interacting with a user (e.g., via a computer system). Operations may also include applying 706 a distortion model to a computer graphic. For example, as shown in FIG. 1, a distortion model, such as the distortion model 116, can be applied to a computer graphic, such as the undistorted object 120. Based upon the application, a distorted graphic (e.g., the distorted object 122) can be produced, and, in some implementations, can be combined with a distorted image (e.g., an image captured by the lens 104), substantially in real-time with user interactions. In some implementations, the distortion model may be applied to an object with relatively low resolution. As such, the applied model may be efficiently applied and reapplied to the object. Thereby, in some arrangements a user may interact in real time with the object (e.g., select, manipulate the object, etc.) as the distortion model is applied. Furthermore, in some arrangements, once a desired appearance is achieved for the low resolution version, a relatively higher resolution version may be computed (e.g., online or offline) for presentation.

To perform the operations described in flow charts 600 and 700, one or both of the graphics package 220 and the graphics distorter 222 may perform any of the computer-implemented methods described previously, according to one implementation. For example, a computer system such as the computer system 106 (shown in FIG. 1) or the computer system 202 (shown in FIG. 2) may execute the graphics package 220 or the graphics distorter 222. The computer system 106 or the computer system 202 may include a processor (not shown), a memory (not shown), a storage device (e.g., the storage device 204) and an input/output device (not shown). Each of the components may be interconnected using a system bus or other similar structure. The processor is capable of processing instructions for execution within the computer system 106 or the computer system 202. In one implementation, the processor is a single-threaded processor, however, one or more multi-threaded processors may be used in other implementations. The processor is capable of processing instructions stored in memory or on a storage device (e.g., the storage device 204) to display graphical information for a user on an input/output device.

Figure 8:
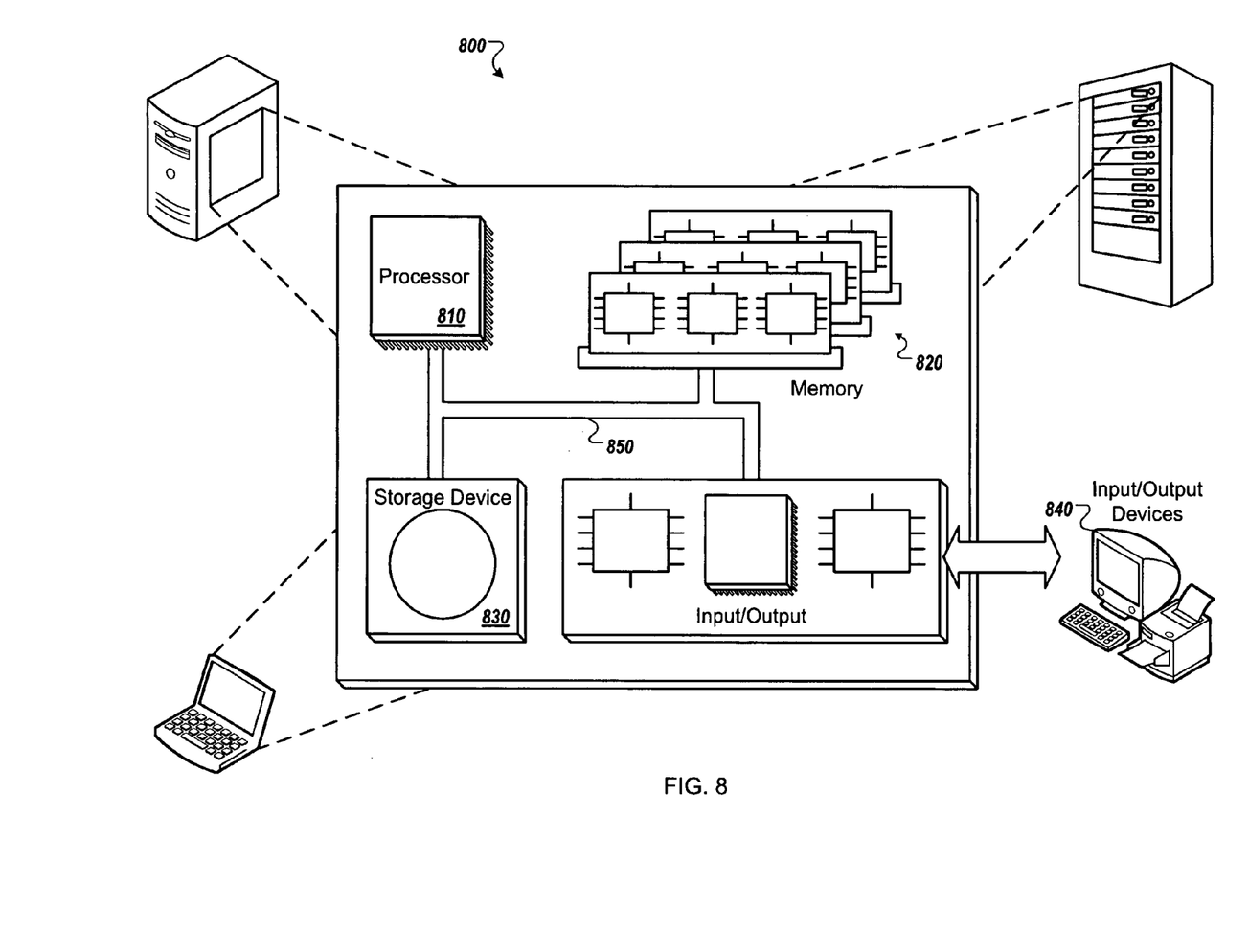
FIG. 8 represents a computer system and related components.

FIG. 8 is a schematic diagram of a generic computer system 800. The system 800 can be used for the operations described in association with any of the computer-implemented methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. The memory 820 is a volatile memory unit in some implementations and is a non-volatile memory unit in other implementations.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A computer-implemented method comprising:
applying a distortion model to a computer graphic to produce a distorted version of the computer graphic, while substantially simultaneously allowing user interactions with the computer graphic, wherein the applied distortion model represents lens distortion, and includes a reduced sample set, a size of the reduced sample set determined using a predefined threshold that is based upon a comparison of the reduced sample set distortion model and a distortion model that includes a complete sample set.

2. The computer-implemented method of claim 1, further comprising:
combining the distorted computer graphic with an image captured with a lens, wherein the distortion model represents distortion provided by the lens.

3. The computer-implemented method of claim 1, wherein user interactions include manipulating the computer graphic as the distortion model is applied.

4. The computer-implemented method of claim 1, wherein the predefined threshold represents the difference between a pixel represented in the reduced sample set distortion model and a pixel represented in the complete sample set distortion model.

5. The computer-implemented method of claim 1, wherein the predefined threshold represents a fraction of a pixel.

6. The computer-implemented method of claim 1, wherein applying the distortion model to the computer graphic includes repetitively applying the distortion model during user interactions with the computer graphic.

7. The computer-implemented method of claim 1, wherein the computer graphic includes a computer generated three dimensional object.

8. The computer-implemented method of claim 1, wherein the computer graphic includes an image.

9. The computer-implemented method of claim 1, wherein the computer graphic represents a user selection device.

10. The computer-implemented method of claim 1, wherein the distorted version of the computer graphic has a relatively low resolution.

11. A system comprising:
a computing device comprising:
a memory for storing at least one computer graphic; and
a graphics distorter for applying a distortion model to the computer graphic to produce a distorted version of the computer graphic, while substantially simultaneously allowing user interactions with the computer graphic, wherein the applied distortion model represents lens distortion, and includes a reduced sample set, a size of the reduced sample set determined using a redefined threshold that is based upon a comparison of the reduced sample set distortion model and a distortion model that includes a complete sample set.

12. The system of claim 11, wherein the computing device further includes:
a graphics package for combining the distorted computer graphic with an image captured with a lens, wherein the distortion model represents distortion provided by the lens.

13. The system of claim 11, wherein user interactions include manipulating the computer graphic as the distortion model is applied.

14. The system of claim 11, wherein the predefined threshold represents the difference between a pixel represented in the reduced sample set distortion model and a pixel represented in the complete sample set distortion model.

15. The system of claim 11, wherein the predefined threshold represents a fraction of a pixel.

16. The system of claim 11, wherein applying the distortion model to the computer graphic includes repetitively applying the distortion model during user interactions with the computer graphic.

17. The system of claim 11, wherein the computer graphic includes a computer generated three dimensional object.

18. The system of claim 11, wherein the computer graphic includes an image.

19. The system of claim 11, wherein the computer graphic represents a user selection device.

20. The system of claim 11, wherein the distorted version of the computer graphic has a relatively low resolution.

21. A computer program product tangibly embodied in an information carrier and comprising instructions that when executed by a processor perform a method comprising:
applying a distortion model to a computer graphic to produce a distorted version of the computer graphic, while substantially simultaneously allowing user interactions with the computer graphic, wherein the applied distortion model represents lens distortion, and includes a reduced sample set, a size of the reduced sample set determined using a predefined threshold that is based upon a comparison of the reduced sample set distortion model and a distortion model that includes a complete sample set.

22. The computer program product of claim 21, further comprising instructions that when executed by the processor perform a method comprising:
combining the distorted computer graphic with an image captured with a lens, wherein the distortion model represents distortion provided by the lens.

23. The computer program product of claim 21, wherein user interactions include manipulating the computer graphic as the distortion model is applied.

24. The computer program product of claim 21, wherein the predefined threshold represents the difference between a pixel represented in the reduced sample set distortion model and a pixel represented in the complete sample set distortion model.

25. The computer program product of claim 21, wherein the predefined threshold represents a fraction of a pixel.

26. The computer program product of claim 21, wherein applying the distortion model to the computer graphic includes repetitively applying the distortion model during user interactions with the computer graphic.

27. The computer program product of claim 21, wherein the computer graphic includes a computer generated three dimensional object.

28. The computer program product of claim 21, wherein the computer graphic includes an image.

29. The computer program product of claim 21, wherein the computer graphic represents a user selection device.

30. The computer program product of claim 21, wherein the distorted version of the computer graphic has a relatively low resolution.

\* \* \* \* \*

UNITED STATES PATENT AND TRADEMARK OFFICE
CERTIFICATE OF CORRECTION

PATENT NO. : 8,446,433 B1
APPLICATION NO. : 12/483539
DATED : May 21, 2013
INVENTOR(S) : Ronald Mallet, Jeffrey Saltzman and Brian Cantwell Page 1 of 1

It is certified that error appears in the above-identified patent and that said Letters Patent is hereby corrected as shown below:

In the Claims Section,

Page 16, column 14, claim 11, line 1, delete
"redefined"
And insert
--predefined--

Signed and Sealed this
Sixth Day of August, 2013

Teresa Stanek Rea
*Acting Director of the United States Patent and Trademark Office*